United States Patent
Meyer

[11] Patent Number: 5,984,242
[45] Date of Patent: Nov. 16, 1999

[54] ONE-PIECE SWIVEL CLIP

[75] Inventor: Charles Meyer, New Lenox, Ill.

[73] Assignee: Illinois Tool Works Inc., Glenview, Ill.

[21] Appl. No.: 09/004,432

[22] Filed: Jan. 8, 1998

[51] Int. Cl.$^6$ ................................................. F16L 3/08
[52] U.S. Cl. ............................ 248/65; 248/544; 248/548
[58] Field of Search ................... 248/70, 71, 73, 248/74.1, 74.2, 544, 548, 489, 65; 403/164; 411/3, 4, 5

[56]        References Cited

U.S. PATENT DOCUMENTS

| | | | |
|---|---|---|---|
| 3,023,990 | 3/1962 | Gunthel, Jr. | 248/70 |
| 4,518,295 | 5/1985 | Matuschek | 411/3 X |
| 4,582,288 | 4/1986 | Ruehl | 248/548 X |
| 4,669,688 | 6/1987 | Itoh et al. | 248/74.2 |
| 4,680,837 | 7/1987 | Rubinstein . | |
| 4,842,237 | 6/1989 | Wollar | 248/548 |
| 5,002,243 | 3/1991 | Kraus et al. . | |
| 5,014,939 | 5/1991 | Kraus et al. | 248/74.2 |
| 5,133,523 | 7/1992 | Daigle et al. . | |
| 5,367,750 | 11/1994 | Ward | 248/74.3 |
| 5,397,093 | 3/1995 | Chubb et al. | 248/544 |
| 5,799,986 | 9/1998 | Corbett et al. | 285/55 |
| 5,799,987 | 9/1998 | Sampson | 285/81 |
| 5,820,048 | 10/1998 | Shereyk et al. | 248/74.1 |

FOREIGN PATENT DOCUMENTS 2 218 462  4/1989  United Kingdom .

*Primary Examiner*—Derek J. Berger
*Attorney, Agent, or Firm*—Kane, Dalsimer, Sullivan and Levy, LLP

[57]        ABSTRACT

The device is a swivel clip with a relatively stationary base element and a relatively rotatable swivel element. The swivel element rotates about a shaft which passes through an aperture in the base element. The swivel clip is initially formed in one piece by molding windows in an upper portion of the swivel element which are opposed to molding windows in a lower portion of the swivel element (that is, alternating around the periphery of the shaft). The windows meet in the base member, forming the swivel shaft, the swivel aperture and the internal gates as a single piece. Subsequently breaking the internal gates provides vestiges which support the swivel shaft within the aperture.

7 Claims, 3 Drawing Sheets

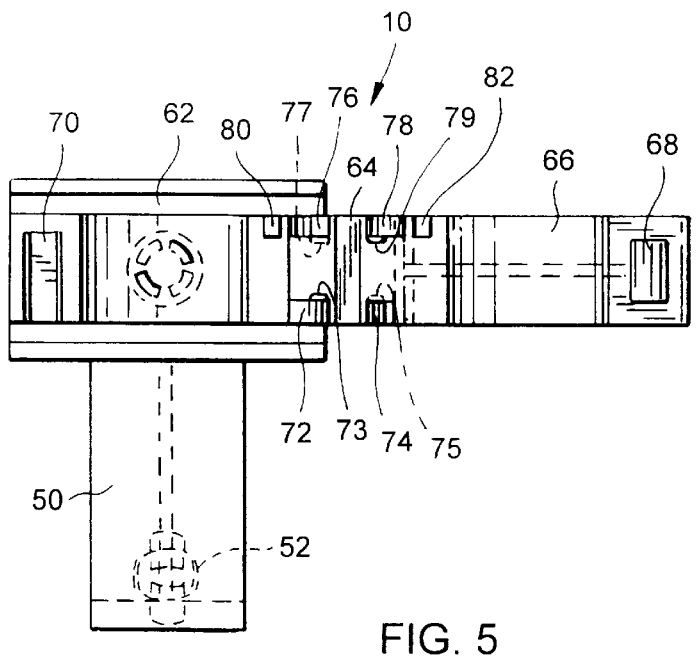
FIG. 5
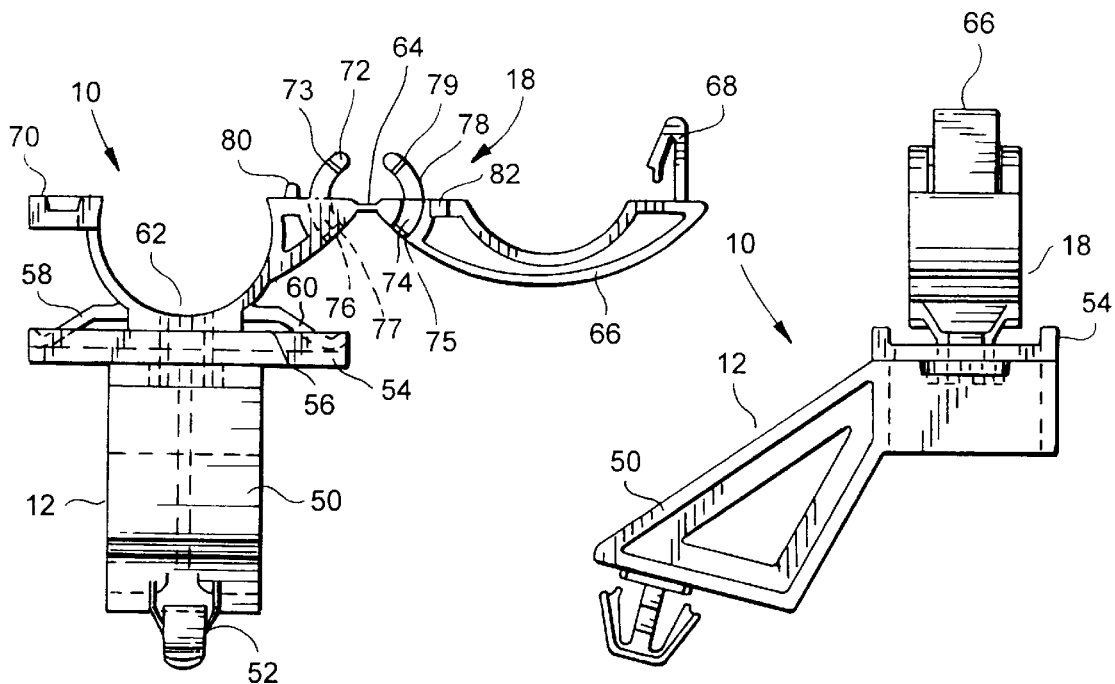
FIG. 3
FIG. 4

ONE-PIECE SWIVEL CLIP

BACKGROUND OF INVENTION

1. Field of Invention

This invention pertains to a swivel clip including a base member with an integrally molded swivel member. Windows are configured in the swivel clip to provide internal gates to fill both members during the molding process. The internal gates are broken prior to use to allow the swivel member to rotate with respect to the base member.

2. Description of the Prior Art

In the prior art, swivel clips are frequently molded as two separate pieces which are snapped together after molding. The snap fits typically require a high insertion force to maintain a marginally acceptable retention force. Similarly, clips are sometimes molded as a single piece with snap detent mechanism to engage an aperture in the structure (for example, architectural or automotive structures), but this does not provide an adequate swivel mechanism for some applications, such as tube routing with a variation in the angle of the tubes. Likewise, this does not provide a high retention force, or at a minimum, provides a retention force which is related to the force required for installation of the clip.

Examples of prior art in this field include U.S. Pat. No. 4,669,688 to Itoh et al. entitled "Cable Clamp"; U.S. Pat. No. 5,133,523 to Daigle et al. entitled "Suspendable Conduit Bracket Lock System"; U.S. Pat. No. 5,367,750 to Ward entitled "Wiring Harness Clip"; U.S. Pat. No. 4,680,837 to Rubinstein entitled "Plastic Swivel Connector and Mold Therefor"; U.S. Pat. No. 5,002,243 to Kraus et al. entitled "Plastic Holding Device with Noise Dampening"; and United Kingdom Patent Application GB 2,218,462A entitled "Cable Retaining Device".

OBJECTS AND SUMMARY OF THE INVENTION

It is therefore an object of this invention to provide a swivel clip which is molded as a single piece.

It is therefore a further object of this invention to provide a swivel clip with simplified assembly.

It is therefore a still further object of this invention to provide a swivel clip with a retention force which is not limited by any insertion force required during the installation.

These and other objects are attained by the present invention by providing a swivel clip wherein the relatively stationary base member and the relatively rotatable swivel member are initially formed as a single piece during the molding process. Opposed windows are configured to provide internal gates to fill both members. These opposed windows are used to form the swivel shaft and its accompanying bore. A variety of window, shaft and gate configurations are possible, but common to all is the opposition of the windows. The windows meet in the relatively stationary base member forming the swivel shaft, bore and internal gates. The opposition of the windows creates a strong joint between the relatively rotatable swivel member and the swivel shaft. After the gates are broken, the vestiges of the gates provide support for the shaft and minimize side play. Flexible arms may be used to minimize vertical play.

A swivel clip that will not separate has many applications. Tube routing clips that allow for variations in tube angle is one. The engineer no longer has to choose between a fixed clip that may be overstressed and fail when accommodating varying tube angle or a swivel clip that may fail to retain the tube when subjected to a modest force.

BRIEF DESCRIPTION OF THE DRAWINGS

Further objects and advantages of the invention will become apparent from the following description and claims, and from the accompanying drawings, wherein:

FIG. 3 is a front plan view, partly in cross section, of the swivel clip of the present invention, illustrating a specific clip structure after the gates have been broken (i.e., pre-driven)

FIG. 4 is a side plan view, partly in cross section, of the swivel clip of the present invention, illustrating a specific clip structure after the gates have been broken (i.e., pre-driven).

FIG. 5 is a top plan view, partly in cross section, of the swivel clip of the present invention, illustrating a specific clip structure after the gates have been broken (i.e., pre-driven).

DETAILED DESCRIPTION OF THE PREFERRED EMBODIMENTS

Figure 1A:
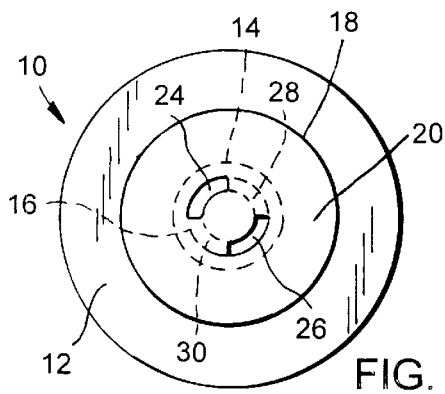
FIG. 1A is a top plan view, partly in cross section, of the details of the one-piece swivel clip of the present invention, showing the radial gate embodiment, and omitting the specific details of the relatively rotatable swivel member.
Figure 1B:
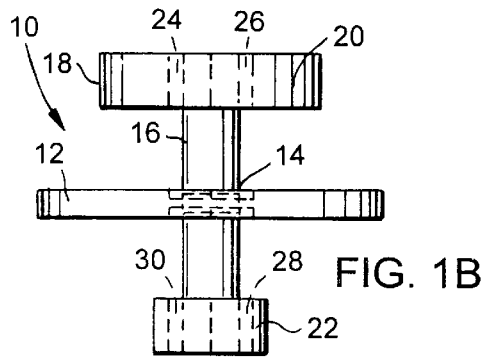
FIG. 1B is a plan view, partly in cross section, of the details of the one-piece swivel clip of the present invention, showing the radial gate embodiment, and omitting the specific details of the relatively rotatable swivel member.

Referring now to the drawings in detail, wherein like numerals refer to like elements throughout the several views, one sees that FIGS. 1A–1D illustrate the radial gate embodiments of the swivel clip 10 of the present invention, while FIGS. 2A–2D illustrate the linear gate embodiments of the swivel clip 10 of the present invention. Both of these embodiments include a relatively stable base member 12 with a swivel aperture 14 through which the swivel shaft 16 of the relatively rotatable swivel member 18 passes. Swivel member 18 includes upper disk 20 on an upper end thereof and lower disk 22 on a lower end thereof. Upper disk 20 is used to attach specific clip configurations while lower disk 22 prevents swivel member 18 from being removed from base member 12 during swivel operation. FIGS. 1A–1D and 2A–2D omit the details of the base member 12 and the swivel member 18. A specific embodiment of base member 12 and swivel member 18 is illustrated in FIGS. 3–7.

The radial gate embodiments (FIGS. 1A–1D) and linear gate embodiments (2A–2D) differ, as will be explained in detail hereinafter, regarding the shape of the vestiges of the broken gates around the periphery of swivel aperture 14 on the base member 12 for supporting swivel shaft 16.

Figure 1C:
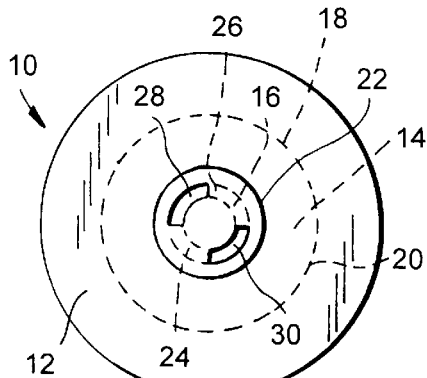
FIG. 1C is a bottom plan view, partly in cross section, of the details of the one-piece swivel clip of the present invention, showing the radial gate embodiment, and omitting the specific details of the relatively rotatable swivel member.
Figure 1D:
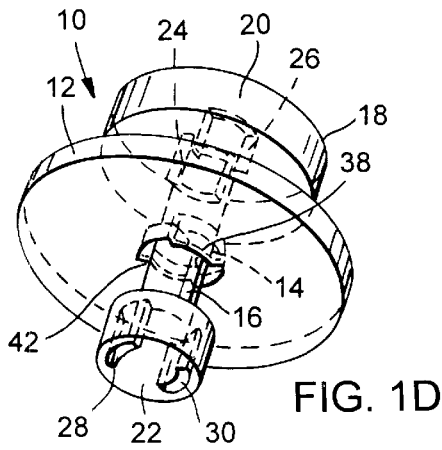
FIG. 1D is a perspective view, partly in cross section, of the details of the one-piece swivel clip of the present invention, showing the radial gate embodiment, and omitting the specific details of the base member and the relatively rotatable swivel member.
Figure 2A:
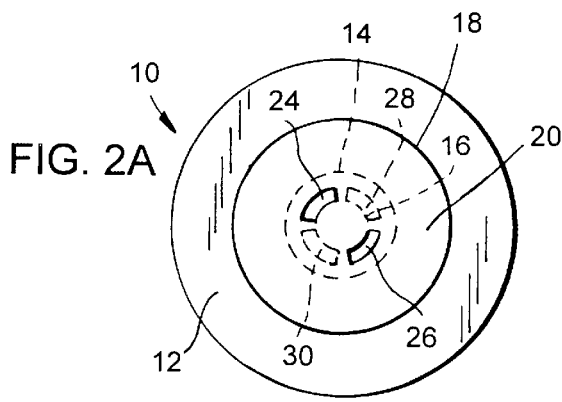
FIG. 2A is a top plan view, partly in cross section, of the details of the one-piece swivel clip of the present invention, showing the linear gate embodiment, and omitting the specific details of the base member and the relatively rotatable swivel member.
Figure 2B:
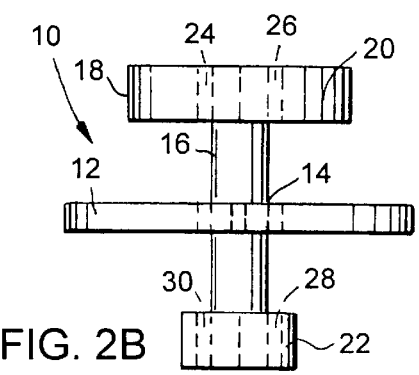
FIG. 2B is a plan view, partly in cross section, of the details of the one-piece swivel clip of the present invention, showing the linear gate embodiment, and omitting the specific details of the base member and the relatively rotatable swivel member.
Figure 2C:
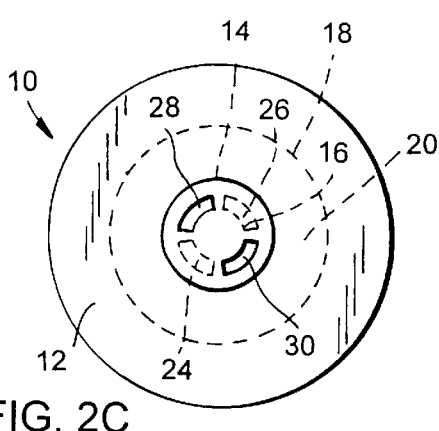
FIG. 2C is a bottom plan view, partly in cross section, of the details of the one-piece swivel clip of the present invention, showing the linear gate embodiment, and omitting the specific details of the base member and the relatively rotatable swivel member.
Figure 2D:
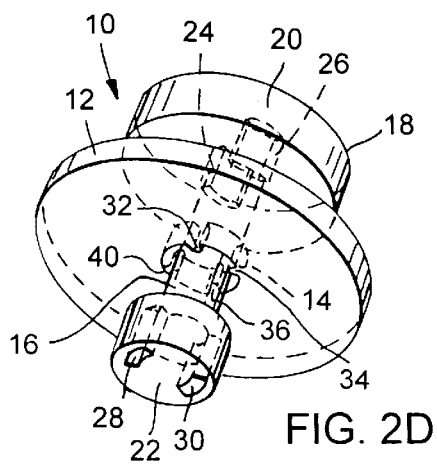
FIG. 2D is a perspective view, partly in cross section, of the details of the one-piece swivel clip of the present invention, showing the linear gate embodiment, and omitting the specific details of the base member and the relatively rotatable swivel element.
Figure 6:
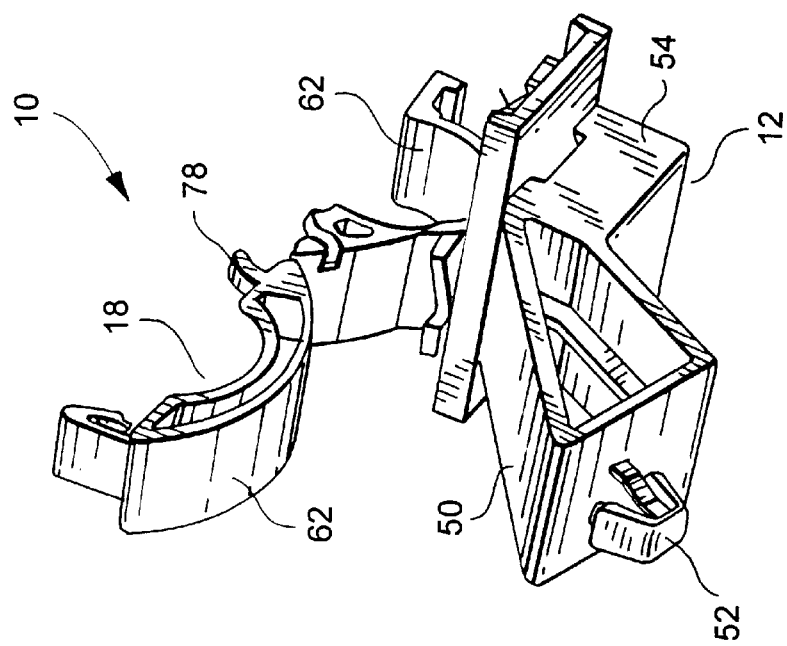
FIG. 6 is a perspective view of the swivel clip of the present invention, as molded.
Figure 7:
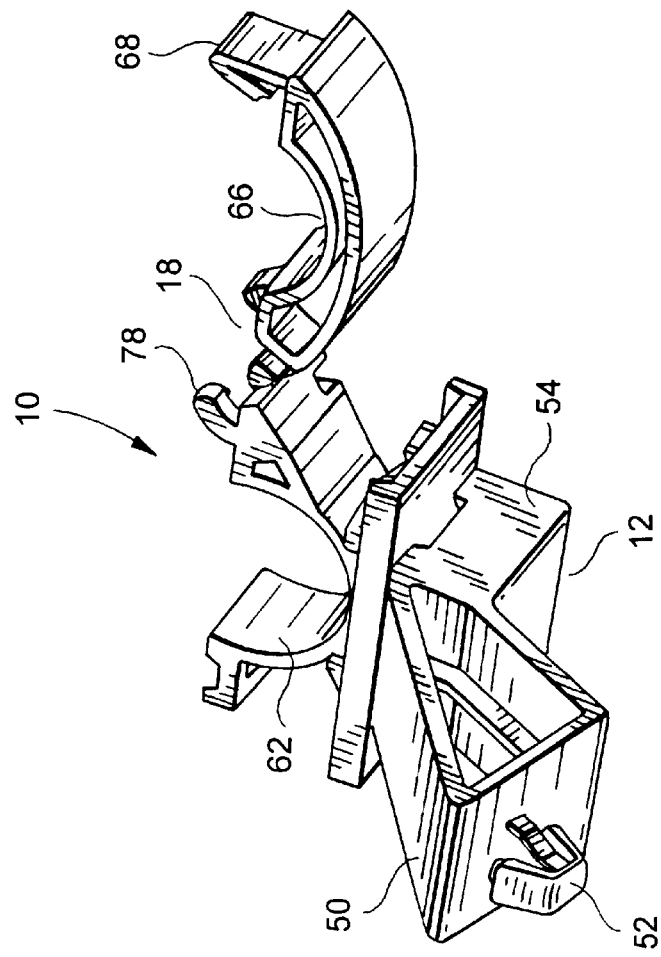
FIG. 7 is a perspective view of the swivel clip of the present invention, "pre-driven", or after the gates have broken but prior to installation.

As shown in FIG. 1A, upper disk 20 includes windows 24, 26 which are illustrated from the 9–12 o'clock position and 3–6 o'clock position, respectively, immediately outwardly radially adjacent from shaft 16. Similarly, lower disk 22 includes windows 28, 30 which are illustrated in phantom in FIG. 1A from the 12–3 o'clock position and 6–9 o'clock position, respectively. This circumferential alternation of the windows 24, 26, 28, 30 results in a configuration with opposed windows. FIG. 1C illustrates a bottom view with the windows 24, 26, 28, 30 in consistent positions with windows 28, 30 shown directly and windows 24, 26 shown in phantom. FIGS. 2A and 2C are somewhat similar to FIGS. 1A and 1C but have windows 24, 26, 28, 30 of somewhat reduced circumferential range. As shown in FIG. 2D, this results in linear vestiges 32, 34, 36, 38 from the broken gates after base element 12 and swivel element 18 are separated after the molding process. In FIG. 1D, radial vestiges 40, 42 are formed from the broken gates after base element 12 and swivel element 18 are separated after the molding process.

During the molding process, windows 24, 26, 28, 30 meet in the base member 12, forming the swivel shaft 16, swivel aperture 14 and internal gates (which subsequently form linear vestiges 32, 34, 36, 38 or radial vestiges 40, 42) therebetween as a single piece. The opposition of the windows 24, 26, 28, 30 creates and strong joint between the swivel member 18 (disks 20, 22) and the swivel shaft 16. After the gates are broken thereby allowing swivel shaft 16 to rotate within swivel aperture 14, the linear vestiges 32, 34, 36, 38 or radial vestiges 40, 42 provide support for swivel shaft 16 and further minimize side play. Lower disk 22 of swivel member 18 may be formed with arms to reduce vertical play and/or to provide engage stops to reduce rotational range of swivel member 18.

FIGS. 3–7 illustrate a specific structure of swivel clip 10. Base member 12 includes cantilever arm 50 which includes a detent snap element 52 on a first end for engaging a structural element (not shown). A second end of cantilever arm 50 includes base structure 54 for engaging swivel member 18, similar to the base member 12 as illustrated in FIGS. 1A–1D and 2A–2D.

As shown in FIG. 3, swivel member 18 includes broad lower base 56 which may be implemented integrally or with arms 58, 60 to minimize sideways play of swivel member 18 with respect to base member 12. Swivel member 18 further includes first semi-circular tube engaging member 62 (illustrated as encompassing slightly more than 180° in order to provide some initial snap detent engagement to a tube element 'not shown') engaged by living hinge element 64 to second semi-circular tube engaging member 66 (illustrated as encompassing slightly less than 180° so that tube engaging members 62, 66 encompass a total of 360°). Second semi-circular tube engaging member 66 includes a snap detent male element 68 at the far end thereof for engaging aperture 70 on base member 12 immediately outward from first semi-circular tube engaging element 62. Additionally, a first side of first semi-circular tube engaging member 62 includes first male engaging element 72 extending about an arc with an axis approximately that of the point of flexure of living hinge element 64. First male engaging element 72 at its far end includes first inwardly extending detent element 73. A similarly shaped first lateral groove 74 is formed on second semi-circular tube engaging element 66. First lateral groove 74 includes first inwardly extending female detent slot 75 on an outer surface of second semi-circular tube engaging element 66. First male engaging element 72 engages first lateral groove 74 and first inwardly extending detent element 73 engages first female detent slot 75 when first and second semi-circular tube engaging elements 62, 66 are joined together.

Likewise, a second side of first semi-circular tube engaging member 62 includes second lateral groove 76 which is laterally adjacent to first male engaging element 72. Second lateral groove 76 includes second inwardly extending female detent slot 77 on an outer surface of first semi-circular tube engaging element 62. Second side of second semi-circular tube engaging element 66 includes second male engaging element 78 extending about an arc with an axis approximately that of the point of flexure of living hinge element 64. Second male engaging element 78 at its far end includes second inwardly extending detent element 79. Second male engaging element 78 engages similarly shaped second lateral groove 76 on first semi-circular tube engaging element 62 and second inwardly extending detent element 79 engages second inwardly extending female detent slot 77 when first and second semi-circular tube engaging elements 62, 66 are joined together.

Similarly, as shown in FIGS. 3 and 5, upwardly extending alignment tab 80 is formed on first semi-circular tube engaging element 62 somewhat further from living hinge element 64 than second lateral groove 76. Alignment aperture 82 is formed at a corresponding position on second semi-circular tube engaging element 66 somewhat further from living hinge element 64 than second male engaging element 78. When first and second semicircular tube engaging elements are joined together, alignment tab 80 engages alignment aperture 82.

First and second inwardly extending detent elements 73, 79 are typically bevelled so as to be somewhat laterally narrower at a distant end thereof so that first and second male engaging elements 72, 78 will easily flex outwardly as first and second semi-circular tube engaging elements 62, 66 approach each other, and then snap inwardly to a detent engagement as first and second semi-circular tube engaging elements 62, 66 are joined to each other.

Therefore, when second semi-circular tube engaging element 66 is folded over completely to engage first semi-circular tube engaging element 62 about a tube or other circular element (not shown), the first and second semi-circular tube engaging elements are engaged or secured to each other by snap detent male element 68 engaging aperture 70; first male engaging element 72 engaging first lateral groove 74, including first inwardly extending detent element 73 engaging first inwardly extending female detent slot 75;

and second male engaging element 78 engaging second lateral groove 76, including second inwardly extending detent element 79 engaging second inwardly extending female detent slot 77.

To make swivel clip 10, the molding is performed with the base member 12 and the swivel member 18 and all associated structure molded as a single piece, typically by injection molding or any similar plastic molding process. Windows 24, 26, 28, 30 meet in the base member 12, forming the swivel shaft 16, swivel aperture 14 and internal gates therebetween as a single piece.

To use swivel clip 10, the user typically breaks the gates thereby forming linear vestiges 32, 34, 36, 38 or radial vestiges 40, 42 and allowing swivel shaft 16 to rotate within swivel aperture 14, linear vestiges 32, 24, 26, 38 or radial vestiges 40, 42 provide support for swivel shaft 16. Alternately, this breaking can be done during the manufacturing process.

The subsequent steps for the user may vary with the application, the preferences of the user, and the details of the structure of the base member 12 and swivel member 18. A typical installation process would include securing the swivel clip 10 to a structural element by way of detent snap element. The user would then engage rotate the swivel member 18 so that first semi-circular tube engaging member 62 engaged a tube or pipe (not shown). As the first semi-circular tube engaging element 62 is illustrated as encompassing slightly more than 180°, first semi-circular tube engaging element will somewhat initially grip or engage the tube. The user then folds over second semi-circular tube engaging member 66 over to engage the tube completely. The various detent mechanisms described above will secure first and second semicircular tube engaging members 62, 66 to each other.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A swivel clip including:

a relatively stationary base member;

a swivel member, including an upper end and a lower end, which is initially integral with said relatively stationary base member, said swivel member and said base member being joined by molding gates, said swivel member being subsequently rotatable with respect to said relatively stationary base member after said molding gates are broken;

said molding gates being formed by first molding windows and second molding windows, said first molding windows being formed on said upper end of said swivel member and said second molding windows being formed on said lower end of said swivel member, said first molding windows being opposed to said second molding windows whereby said first and second molding windows alternate about a periphery of said swivel member.

2. The swivel clip of claim 1 wherein said swivel member includes a shaft between said upper end and said lower end, said shaft passing through an aperture of said base member, said molding gates being formed between said aperture and said shaft when said swivel member is initially integral with said base member, said molding gates being subsequently broken to form vestiges to support said shaft in said aperture.

3. The swivel clip of claim 2 wherein said base member includes means for attaching said base member to a first external object and said swivel member includes means for attaching said swivel member to a second external object.

4. The swivel clip of claim 2 wherein said base member includes a detent element for engaging a first external object and said swivel member includes an element for engaging a tubular member.

5. The swivel clip of claim 4 wherein said element for engaging a tubular member includes a first semi-circular element hinged to a second semi-circular element and further including at least one locking element for securing said first semi-circular element to said second semi-circular element.

6. The swivel clip of claim 5 wherein said first semi-circular element is integral with said swivel member and is attached to said second semi-circular element by a living hinge.

7. The swivel clip of claim 6 wherein said first semi-circular element encompasses more than 180°, and wherein said first and second semi-circular elements encompass a total of 360°.

* * * * *